(12) United States Patent
Clarke

(10) Patent No.: US 6,721,688 B1
(45) Date of Patent: Apr. 13, 2004

(54) REMOTE DEVICE MONITORING

(75) Inventor: Paul A. Clarke, Burgess Hill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/538,419

(22) Filed: Mar. 29, 2000

(30) Foreign Application Priority Data

Mar. 30, 1999 (GB) .............................................. 9907182

(51) Int. Cl.$^7$ ................................................ G06F 11/00
(52) U.S. Cl. ..................... 702/188; 702/80; 702/120; 702/122; 709/202; 709/203; 709/212; 709/230; 705/75; 705/76
(58) Field of Search ............................ 702/188, 1, 127, 702/80, 82, 85, 91, 119, 120, 122, 123, FOR 155, 159, 162; 709/206, 200–203, 212, 213, 216–219, 230–235, 249, 318, 319, FOR 100, 103, 106, 111, 189; 705/39; 600/300

(56) References Cited

U.S. PATENT DOCUMENTS 5,848,378 A * 12/1998 Shelton et al. .................. 702/3
6,006,228 A * 12/1999 McCollum et al. ............. 707/9

FOREIGN PATENT DOCUMENTS

| EP | 0822473 | 2/1998 | .......... G05B/19/418 |
| GB | 2301980 | 12/1996 | .......... H04M/11/00 |
| GB | 2305818 | 4/1997 | .......... H04M/11/00 |
| GB | 2305819 | 4/1997 | .......... H04M/11/00 |

OTHER PUBLICATIONS

Siberschatz et al., Operating System Concepts, Jan. 1995, Addison–Wesley Company Inc., 4$^{th}$ Edition, pp. 401–402.*
So et al., "Academic Papers—Building Automation Systems on the Internet", vol. 15, No. 5/6, May.Jun. 1997, pp. 124–133.
George Lawton, "Dawn of the Internet Appliance", Industry Trends, Computer, i.garber@computer.org.
Howard M. et al., "Managing Devices with the Web", BYTE, US, McGraw–Hill Inc. vol. 22, No. 9, Sep. 1997, pp. 45–4.

* cited by examiner

*Primary Examiner*—Marc S. Hoff
*Assistant Examiner*—Elias Desta
(74) *Attorney, Agent, or Firm*—Gregory L. Thorne

(57) ABSTRACT

A method and apparatus are provided for remotely monitoring the functioning of software processes (66) in a network connected device. The device hosting the processes is provided with a web server (60) and a library (64) of stored data-gathering or debugging functions. Each of the stored functions (64) is assigned to a particular process or group of processes (66), and each has a respective name stored in a table (62) of functions linked with the server (60). On detecting receipt of a message from a remote user including the identifying name of a stored function, the web server (60) causes that function to be applied to the associated process, obtains the data gathered by the function, and passes the gathered data to the remote user. User-defined control functions to restrict access to the process data may be supported.

10 Claims, 3 Drawing Sheets

REMOTE DEVICE MONITORING

BACKGROUND OF THE INVENTION

The present invention relates to the performance monitoring of electronic devices and particularly, though not exclusively, to remotely monitoring and/or debugging of software operations in devices connected to the Internet/World Wide Web.

As described in an article entitled "Dawn of the Internet Appliance" by George Lawton in Computer, vol. 30, no. 10, pp16–18, October 1997, Internet technologies have had an enormous impact in terms of the way large numbers of disparate devices are now able to transmit important instructions and information via the Internet. With the standardization of Internet protocols and competition among Internet service providers (ISP's), the price of Internet connectivity has sharply fallen and manufacturers are now finding it economical to incorporate it into a wide variety of devices, including factory machinery, VCR's and hand-held appliances such as PDA's (personal digital assistants). Moreover, because web browsers are so common, developers can provide sophisticated low cost interfaces by supporting web servers in their products.

At the implementation level, the web server itself may be a very small and simple piece of code which controls the flow of information between the appliance (the device featuring the server) and a remote third-party. Within the appliance, multiple software processes may be running to implement a variety of appliance specific tasks. The conventional method for linking these software processes with the server software is to use a number of functions within each process which are called by the server. When the server receives an information request from a querying third party, it analyses the request to identify the software module and function that should be called and then calls the function. This function, once called, returns accumulated information to the web server which in turn sends it over the Internet to the querying third party.

There are a number of problems with this approach, however. Firstly, there are a lot of static functions that the web server software calls and the other appliance software must provide. This means that to add a new information retrieval function to the system, the function must be written and the server altered to directly call it. This involves a lot of work and makes the resulting software difficult to modify or maintain. Secondly, there is no simple way to dynamically enable or disable information retrieval functions while the appliance is operating. As the information being retrieved can vary from debugging information through to usage statistics, flexibility of information filtering is a desirable feature.

SUMMARY OF THE INVENTION

It is therefore an object of the present invention to provide a diagnostic or monitoring method, and apparatus embodying the same, having improved flexibility in the handling and modification of appliance functions.

In accordance with a first aspect of the present invention there is provided a method for monitoring software modules in a device hosting said modules together with a remotely accessible server and a plurality of stored data-gathering functions, wherein the server, on detecting receipt of a message from a remote user identifying a particular module and a function, causes that function to be applied to the module, obtains the data gathered by said function, and passes the gathered data to the remote user; characterized in that each data gathering function is assigned to a particular module or group of modules, each has a respective name stored in a table of functions in the device, and the obtaining of data by the remote user is directed by the sending of the respective name to the server, and the triggering of the associated function through the table.

Also in accordance with the present invention there is provided a network addressable apparatus hosting a plurality of operational software modules, the apparatus comprising: a data processor coupled with first storage means, the processor running said software modules from storage within the first storage means; a network interface coupled with said processor; a web server hosted by said processor and handling network communications of the apparatus; wherein the first storage means further stores a plurality of data-gathering functions, wherein the server is arranged to detect receipt of a message from a remote user identifying a particular software module and data-gathering function, to cause that function to be applied to the module, obtain the data gathered by said function, and pass the gathered data via the network interface to the remote user;

characterized in that the apparatus further comprises second storage means coupled with the data processor and web server, with each data gathering function assigned to a particular module or group of modules and each having a respective name stored in a table of function identifiers in said second storage means, wherein the application of a data gathering function is triggered on determination by the web server that the name for that function has been received via the network and appears in the table of function identifiers.

By use of the table, a highly flexible technique is provided for attaching functions within appliance processes. Instead of having a myriad of inflexible static functional links between the server and each software process within the appliance, an apparatus having the web server arrangement according to the present invention supports a registration scheme whereby software processes may, during initialisation or at other times, register additional or modified data gathering functions without having to rewrite or reconfigure the web server.

Further features and advantages of the present invention are defined in the attached claims to which reference should now be made, and will become apparent from reading the following description of systems embodying the present invention.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENTS

Figure 1:
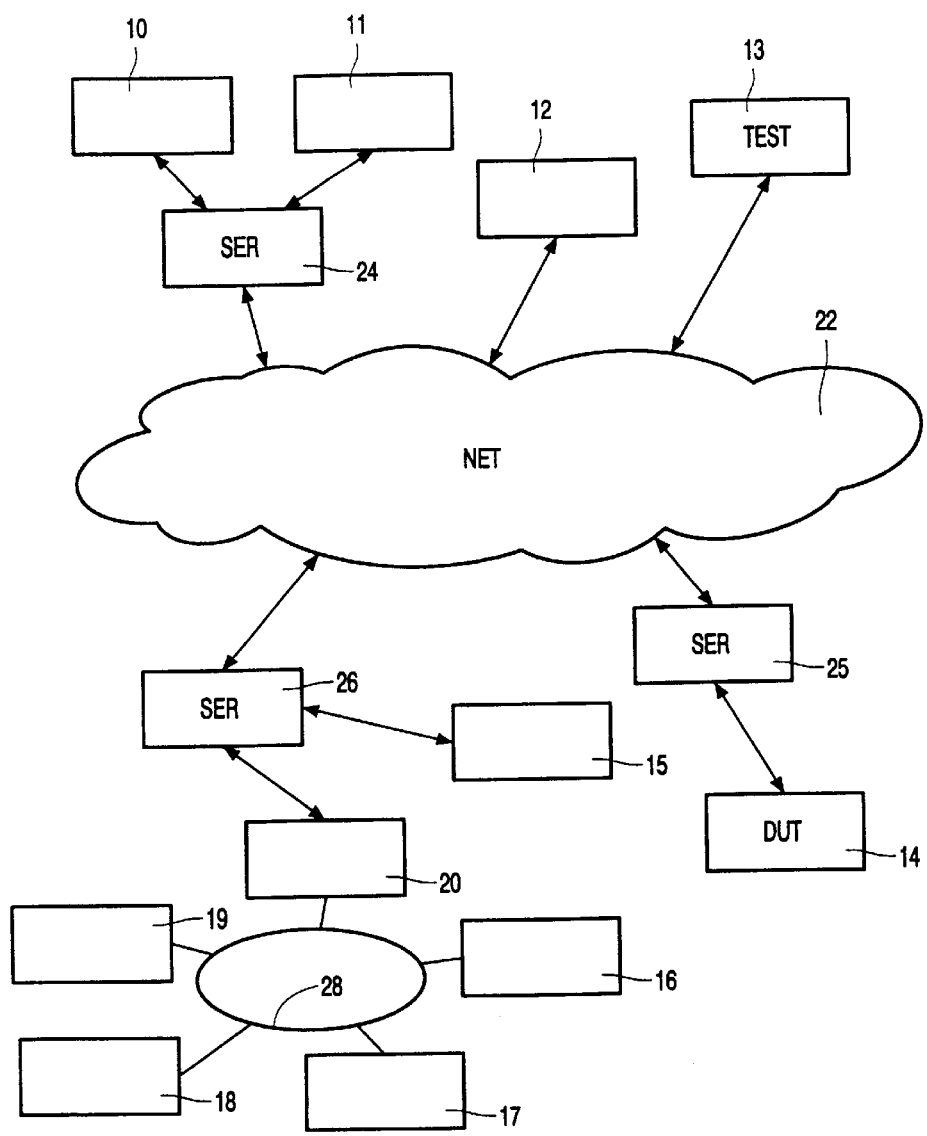
FIG. 1 represents a plurality of network-linked devices, with one device remotely monitoring the operation of another.

FIG. 1 shows a typical host system for the present invention with a plurality of individually addressable devices 10–20 connected for the exchange of communications and/or data via network 22. In the following examples, the device interconnection will be assumed to be via the Internet/World Wide Web, although the skilled reader will appreciate that the present invention is not so limited, being also applicable to smaller, local-area networks (LAN's) and intranets.

In the FIG. 1 example, some of the addressable devices 12, 13 are directly linked to the network 22, whilst others 10, 11, 14, 16–20 are connected via local servers 24–26. Some of the devices 16–20 may be interconnected via LAN 28, which in turn may be linked to the network 22 via one of the devices 20 and a local server 26. In the following, we are concerned with the monitoring of one particular device (device-under-test) DUT 14 from a further device (TEST) 13 at a remote location.

Figure 2:
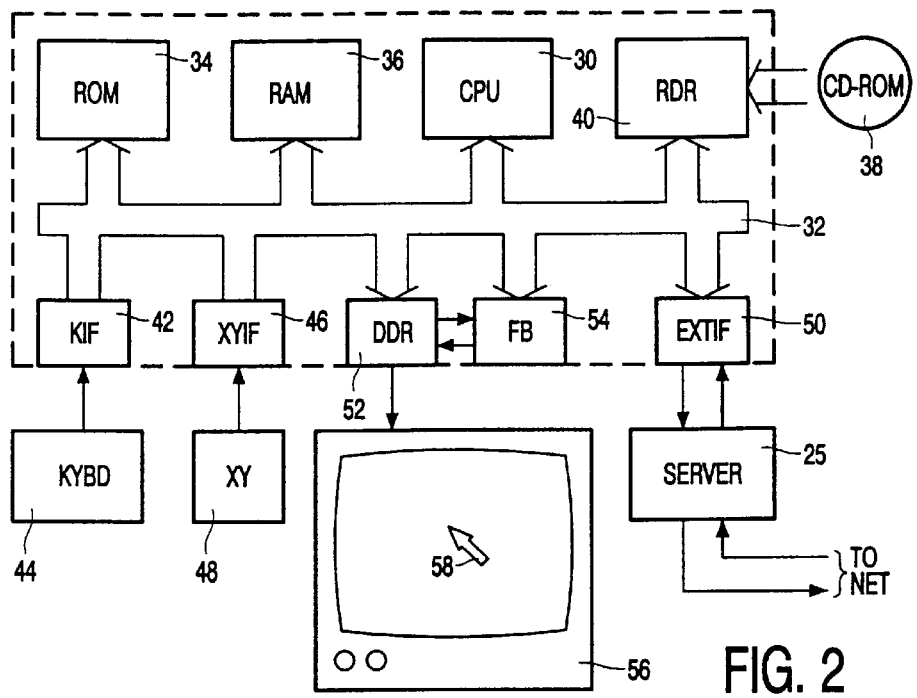
FIG. 2 is a block schematic diagram of the component features of a data processing apparatus suitable for use as the monitored device in the arrangement of FIG. 1.

A typical DUT 14, in the form of a personal computer (PC), is shown in FIG. 2. The device comprises a central processor (CPU) 30 linked via an address and data bus 32 to non-volatile read-only memory (ROM) 34 and random access memory (RAM) 36. A further source of stored data may suitably be magnetic or optical disc such as CD-ROM 38 accessed by a suitable reader 40 controlled by the CPU via the bus 32. For connection of peripheral devices, a number of suitable interfaces are provided, again accessed via the bus 32. These interfaces include a keyboard interface 42 to receive signals from a conventional keyboard or keypad 44; a pointer interface 46 to receive two-dimensional (or optionally three-dimensional for some applications) movement signals from an XY pointer device such as a mouse or trackball 48; and an external interface 50 linking the data and address bus 32 to the local server 25. Also coupled with the bus are a display driver stage 52 and frame buffer 54, with the display driver calling up images assembled in the frame buffer for output to a display 56, such as a cathode-ray or liquid crystal display device. As illustrated, an on-screen cursor 58 is provided, with movement and selection being controlled via the mouse or trackball device 48.

As will be appreciated, the DUT 14 is not necessarily a PC and the component parts identified in FIG. 2 should not be construed as limiting. For example, where the DUT is a VCR, features such as the disc reader 40 and control device interfaces 42, 46 will be omitted, but additional features such as a TV tuner and cassette read/write mechanism will be present. The common features required for devices embodying the present invention are a network interface together with at least a limited amount of data processing and storage capability.

Figure 3:
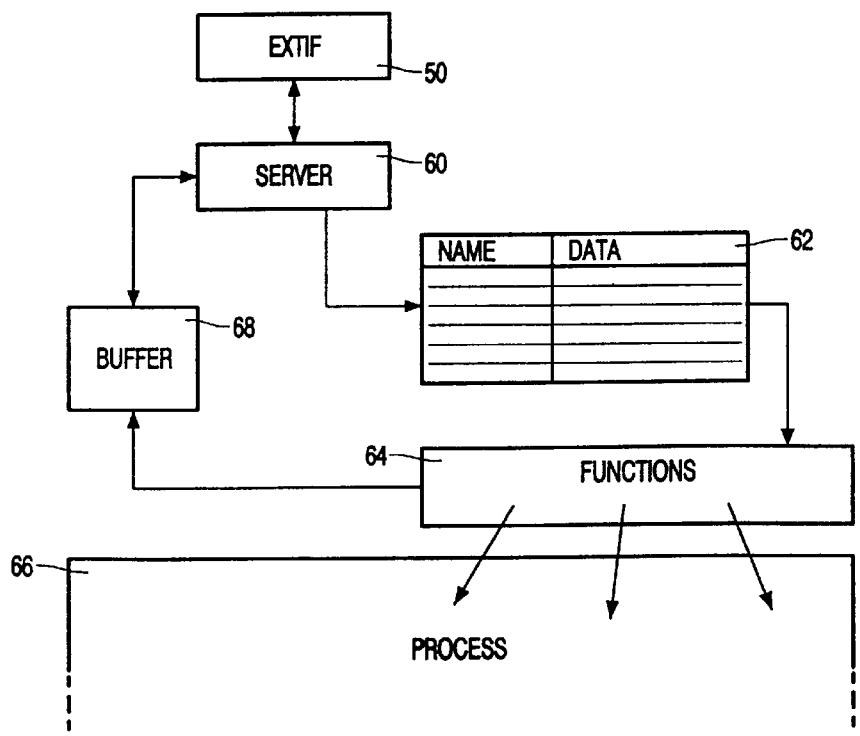
FIG. 3 represents the relationship between some functional features of the apparatus of FIG. 2.

The functional features of the present invention, as embodied in the apparatus of the DUT 14 are shown in FIG. 3. From the network interface 50, a web server 60 hosted by the device processor handles communications to and from the device via the network. Linked to the web server is a rewritable look-up table 62 containing respective identifying names and ancillary data for a group of data gathering functions 64 hosted by the apparatus. When called, these data gathering functions perform respective pre-defined tasks of monitoring (recording, reading, counting, debugging etc.) on the software process modules 66 defining the operational features of the apparatus itself. The data gathered by one or more of the functions 64 is buffered 68 prior to being dispatched by the web server 60 to the remote device (13; FIG. 1) which initiated the calling of the or those functions.

As described above, instead of having myriad inflexible static functional links between the web server and each software process within the appliance, the present web server has a registration scheme whereby software processes may, during initialisation or at any other time, register data-gathering functions with names and other parameters with the web server 60. The web server 60 maintains the table 62 of registered functions with associated names and other parameters. These parameters may include items describing the family of data, and who may retrieve it, and this can in turn be used with a user-determined mask (which may be applied or modified by the user through operation of the apparatuses controls) to allow or prevent certain information families from being sent to enquiring clients. For example, in the case of socalled "click" histories (records of a users control key actuations), if the user is happy for the click history to be tracked by a broadcaster then a particular film may be watched at a special low price, but if the click history is to be kept private, then the viewer will have to pay the usual pay-per-view fee. The broadcaster can use the click history to get better advertising revenue instead of asking the user to pay.

Figure 4:
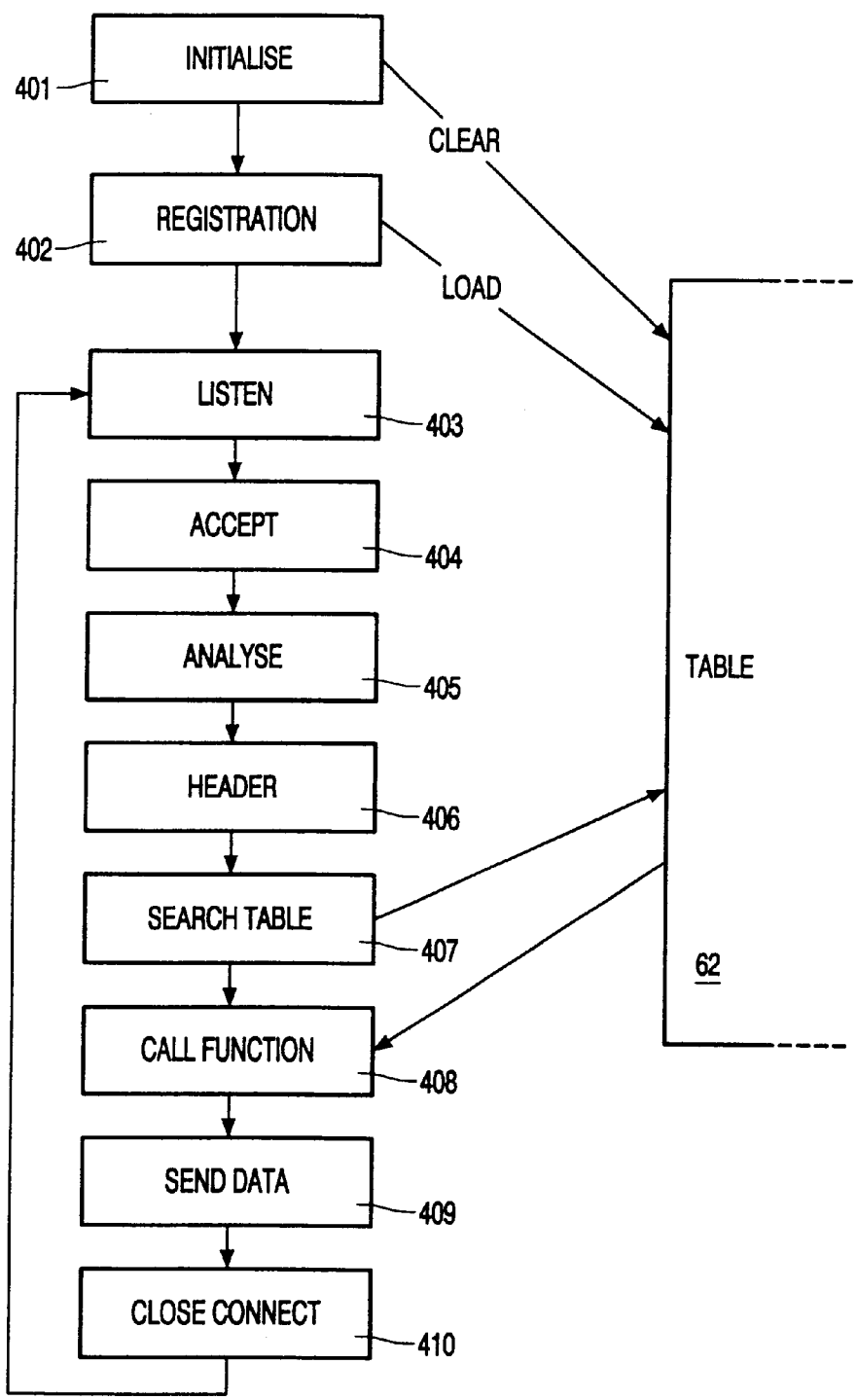
FIG. 4 is a flow chart of a monitoring procedure supported by the features of FIG. 2.

FIG. 4 is a flow chart illustrating an operational implementation of the monitoring process, based around the table 62 which is arranged to match received name strings (in calls received by the web server 60) against associated function pointers. One example of a name string might be "memory_frag" which identifies, via the table 62, a pointer to the function 64 arranged to determine the memory fragment list.

At the head of the process is an initialisation software function 401 that clears the table 62, followed by a registration function 402 allowing different software modules to register debugging or monitoring names and associated functions with the server 60 for inclusion in the table 62. During initialisation the web server resets its data retrieval function table. As different sub-systems within the appliance start they call the retrieval registration function of the web server giving the address of a data retrieval function, an associated URL fragment, and a function class, and details of who may retrieve the data. The concept of who may retrieve the data is important as there may be some types of data that can be retrieved by anyone provided they have licensed or bought the users address information from the appliance supplier.

Following intialisation and registration, the process enters a main loop 403–410 which commences at 403 with the web server 60 listening for a connection at the network interface 50. Listening is generally a blocking function within the operating system. In other words, once the web server calls the step function 403, the web server software module will consume zero processing power until a remote device calls to request data, whereupon the server will be woken by the operating system for the operation to continue. At 404, a Hyper Text Transport Protocol (HTTP) request message is accepted when a connection is established from a remote device 13 (e.g. a debugging host). At 405, the server analyses the name of the function that is required from the HTTP request received, and at 406 generates a simple HTTP response header to the source 13 of the request. At 407, the server searches the table 62 for a matching function name and, at 408, calls the registered function if a matching name is found. At 409 the buffered results 68 built up by the function called are sent back to the requesting device 13, following which at 410 the connection is closed and the system reverts to 403 to listen for a further connection.

Returning to the click history example, within the system initialisation code may appear the following:

webserver_register(ClickHistoryFn,
      "click_history",
      TV_WATCHING_BEHAVIOUR,
      RETRIEVER_CLASS_9);

Thus the click history may be retrieved by requesting the following web resource:

http://[appliance address]/click_history

When the request arrives at the [appliance address] the web server checks that it has a data retrieval function called "click_history", checks that the user has TV_WATCHING_BEHAVIOUR data retrieval enabled, and then verifies that the requester is part of the group known as RETRIEVER_CLASS_9. If all these are true then the registered function is called. The function returns a pointer to the buffer of data that should be sent back to the requesting client.

Note that to add a new function the web server does not need to be modified at all. Instead, the initialisation code simply calls the registration function with details of the new retrieval function that is to be provided. The registration mechanism allows system-dependent software modules or processes to define a mapping between the function identifier/name and the function itself. This means that there is no system monitoring or debugging "knowledge" required within the web server itself, and the same web server system can be extended as the hosting appliance is developed without changing the web server software itself.

Furthermore, a requesting client can connect to the device through the Internet and can request a list of the functions that are registered with the web server and available to their class together with an indication of whether the user has enabled access to that function or class of function. Part of the web server software allows the user to easily control access to the data retrieval functions either by a coarse class level or by a fine function level within a class.

From reading of the present application, other modifications will be apparent to those skilled in the art. Such modifications may involve other features which are known in the design, manufacture or use of web-connectable devices, which may be used instead of, or in addition to, features described herein. For the avoidance of doubt, the scope of the present invention is to be determined solely by the following claims.

What is claimed is:

1. A method for monitoring software modules in a device hosting said modules together with a remotely accessible server and a plurality of stored data-gathering functions, wherein the server, on detecting receipt of a message from a remote user identifying a particular module and a function, causes that function to be applied to the module, obtains the data gathered by said function, and passes the gathered data to the remote user;

wherein each data gathering function is assigned to a particular module or group of modules, each has a respective name stored in a table of functions in the device, and the obtaining of data by the remote user is directed by the sending of the respective name to the server, and the triggering of the associated function through the table, wherein running software calls functions using the table to locate program code stored outside the table for effecting execution of the functions.

2. A method as claimed in claim 1, wherein on receipt of a function name by the server, a further check is made as to whether the message meets one or more predetermined access conditions and only triggers the identified function if those conditions are met.

3. A method as claimed in claim 2, wherein the owner of the device being monitored is enabled to set and/or vary the conditions for remote access to the server.

4. The method of claim 1, wherein the table is indexed by the respective function names.

5. A network addressable apparatus hosting a plurality of operational software modules, the apparatus comprising:

a data processor coupled with first storage means, the processor running said software modules from storage within the first storage means;

a network interface coupled with said processor;

a web server hosted by said processor and handling network communications of the apparatus;

wherein the first storage means further stores a plurality of data-gathering functions, wherein the server is arranged to detect receipt of a message from a remote user identifying a particular software module and data-gathering function, to cause that function to be applied to the module, obtain the data gathered by said function, and pass the gathered data via the network interface to the remote user;

wherein the apparatus further comprises second storage means coupled with the data processor and web server, with each data gathering function assigned to a particular module or group of modules and each having a respective name stored in a table of function identifiers in said second storage means, wherein the application of a data gathering function is triggered on determination by the web server that the name for that function has been received via the network and appears in the table of function identifiers, wherein running software calls functions using the table to locate program code stored outside the table for effecting execution of the functions.

6. Apparatus as claimed in claim 5, wherein said table of function identifiers further holds access criteria for the triggering of at least some of the data gathering functions, and the web server is arranged to trigger such functions only in the event that receipt of the function name is accompanied by determination by the server that the access criteria have been met.

7. Apparatus as claimed in claim 6, further comprising user-operable input means by operation of which a user is enabled to set or modify said access criteria.

8. Apparatus as claimed in claim 5, wherein the web server is configured to identify a predetermined message received via the network and thereafter receive specification of a new or modified data-gathering function and associated name therefor and store them in the first and second storage means respectively.

9. Apparatus as claimed in claim 5, wherein the web server is configured to identify a predetermined message received via the network and thereafter to generate and send via the network a message identifying the currently stored data-gathering functions.

10. The apparatus of claim 5, wherein the table is indexed by the function identifiers.

* * * * *